Feb. 17, 1953  F. W. SEYBOLD  2,628,680
GUILLOTINE KNIFE-AUTOMATIC ELECTRICAL BACK GAUGE
Filed Sept. 2, 1949  4 Sheets-Sheet 1

INVENTOR
FREDERICK W. SEYBOLD
BY
Ostrolenk & Faber
ATTORNEYS

Feb. 17, 1953　　　　F. W. SEYBOLD　　　　2,628,680
GUILLOTINE KNIFE-AUTOMATIC ELECTRICAL BACK GAUGE
Filed Sept. 2, 1949　　　　　　　　　　　　4 Sheets-Sheet 2

INVENTOR
FREDERICK W. SEYBOLD
BY
Ostrolenk & Faber
ATTORNEYS

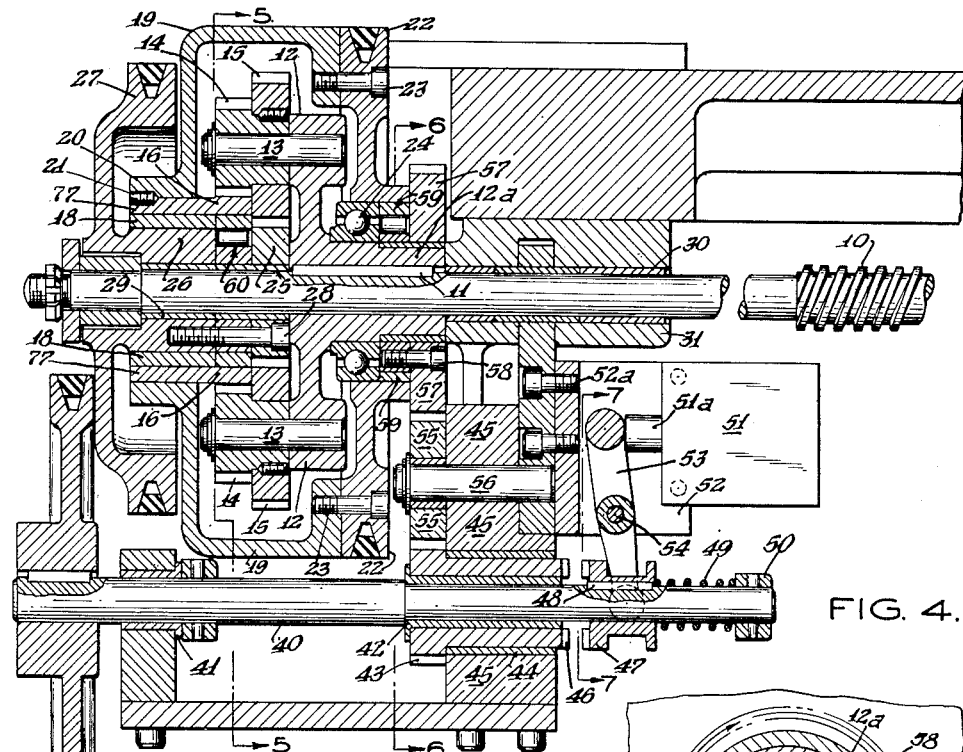
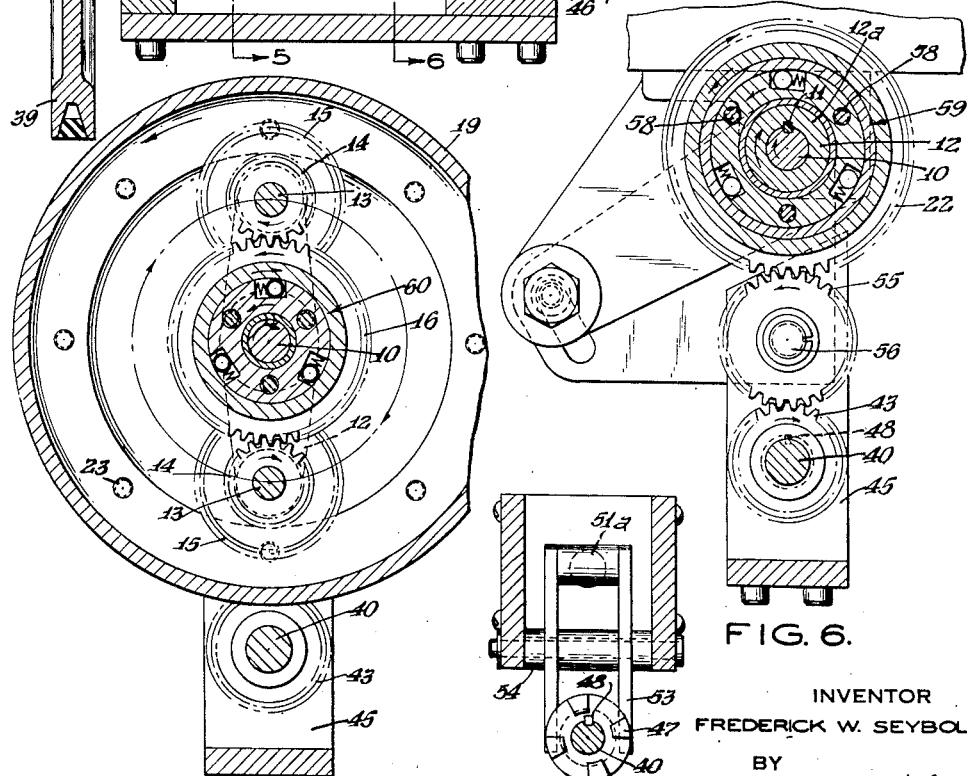
FIG. 4.
FIG. 5.   FIG. 7.   FIG. 6.
INVENTOR
FREDERICK W. SEYBOLD
BY
Ostrolenk & Faber
ATTORNEYS Patented Feb. 17, 1953

2,628,680

UNITED STATES PATENT OFFICE 2,628,680

GUILLOTINE KNIFE-AUTOMATIC ELECTRICAL BACK GAUGE

Frederick W. Seybold, Westfield, N. J., assignor to E. P. Lawson Co., Inc., New York, N. Y., a corporation of New York Application September 2, 1949, Serial No. 113,717

10 Claims. (Cl. 164—48)

My present invention relates to electrically operated automatic spacing mechanism and more particularly to an automatic spacing mechanism specifically designed for use in connection with guillotine type paper cutters.

In the operation of guillotine type paper cutters, a pile of paper is placed on the work table beneath the cutting knife. The back gauge usually provided on the work table is then adjusted so that the portion of the pile which it is desired to cut off extends forward of the cutting knife edge so that when the knife is brought down, it will cut off an exactly dimensioned section of the pile.

In operating paper cutters of this type, therefore, it frequently becomes necessary to adjust the back gauge many times for different cuts which are to be made. Even if a plurality of regular cuts is to be made from a single pile, the back gauge must be moved up each time in order to ensure that the edges are perfectly squared so that the exact cut may be made.

The object of my invention is the provision of a novel automatic back gauge spacing mechanism which will adjust the back gauge at successive individually predetermined intervals after successive cuts.

By the use of my invention, therefore, the operator need do nothing more than place the initial pile of paper on the machine against the back gauge and then operate the paper cutter so that the knife moves up and down a desired number of times to cut the desired number of piles.

The back gauge automatic spacing mechanism automatically moves the back gauge the proper distance at the end of each cut and before the next cut is started.

Automatic operation or spacing of the back gauge is already known as shown in the prior Patent No. 2,053,499.

My invention is directed specifically to automatic electrical control elements for successively moving the back gauge by predetermined intervals after individual cuts.

Essentially, my invention contemplates the utilization of a carriage moving transversely across the front of the machine in synchronism with the movement of the back gauge and for equal distances.

A photo-sensitive medium, such as a photoelectric tube, and a light source are borne by the carriage across the front of the machine. An indicator or regulating strip is located between the light source and the photo-sensitive medium.

In its simplest form, the indicator or regulating strip is provided with a plurality of successive rectangular openings, the left-hand edges of which are each spaced from each other by the exact distance which the back gauge is to travel between successive cuts.

Electrically controlled driving mechanism is provided for the back gauge, this driving mechanism being in turn controlled by the manner in which light falls on the photo-sensitive medium.

When the operation of the back gauge is initiated, this operation takes place at full speed to drive the back gauge forward rapidly at the same time as the carriage is driving transversely at equal speed.

When light from the light source first passes through one of the rectangular openings on the indicator strip, circuits are operated to reduce the forward speed of the back gauge and also at the carriage.

When the light from the light source is then cut off by the left-hand edge of the opening, the back gauge and the carriage are halted in their movement.

Thus, a heavy pile of paper may be brought up rapidly by the back gauge to near the point where it is to be stopped. Thereafter it is slowed down and then finally brought to a stop. The slow down interval prevents a sudden stop of the back gauge from causing a paper pile to cross beyond the predetermined position.

Thus, the final speed of the back gauge and its carriage may be as little as 1% of the speed at which the paper pile is brought up to close to the stopping point.

Thus, the width of the rectangular openings need not be more than one-eighth or one-quarter of an inch in order to ensure that the paper pile is slowed down sufficiently so that it will be stopped accurately.

The primary object of my invention, therefore, is the provision of novel back gauge control means wherein electrically operated or controlled driving elements are in turn controlled by a photo-sensitive medium and light source moving synchronously with the back gauge and so arranged that the first change in the light condition after the initiation of operation will cause the back gauge to be slowed down and the second change in the light condition after initiation of the operation will cause the back gauge to be stopped.

While a strip may be used for each run with openings perforated therein, it will be obvious that sliding plates may be used movable against the scale to determine the position of the various rectangular openings and also that various sliding elements including pointers may be used to determine the position of the various stops.

Where pointers are used, then the circuit may be arranged so that the darkening of the photo-sensitive medium will cause a slow down and the relighting of the photo-sensitive medium will cause a stop.

Preferably, the initiation of the operation is so arranged that the lifting of the knife and clamp clear of the paper pile will set the apparatus in motion, although a by-pass switch may be provided so that the back gauge may be set in motion manually when desired.

In order to perform this operation, preferably two electrical motors are provided connected by planetary gear arrangements in such manner that when the motors are turning at a predetermined speed in the same direction they will produce a net high forward speed.

The change in the light condition upon the photocell will operate a pole changing switch to reduce the speed of one of the motors, thereby producing a very small net forward speed, and a second change in the light condition on the photocell will halt both motors.

In addition, when the back gauge has reached its full forward position, a solenoid operated clutch may be utilized to permit a reversal and fast return of the back gauge.

This may be accomplished electrically or preferably by a mechanical clutch reversing mechanism energized by a solenoid which is operated when the reversing switch is closed.

Thus, additional objects of my invention are the utilization of two motors for driving my back gauge in the forward direction with means provided for reducing the speed of one of the motors to reduce the high speed to a low speed and by further means for halting both motors at the stopping position.

Another object of my invention is the provision of novel back gauge regulating and indicating mechanism, including light sensitive means to determine the slow down and stopping position of the back gauge.

The foregoing and many other objects of my invention will become apparent in the following description and drawings in which:

Figure 4 is a cross-section taken on line 4—4 of Figure 2 looking in the direction of the arrows.

Figure 5 is a cross-sectional view taken on line 5—5 of Figure 4 looking in the direction of the arrows.

Figure 6 is a cross-sectional view taken on line 6—6 of Figure 4 looking in the direction of the arrows.

Figure 7 is a cross-sectional view taken on line 7—7 of Figure 4 looking in the direction of the arrows.

Figure 1:
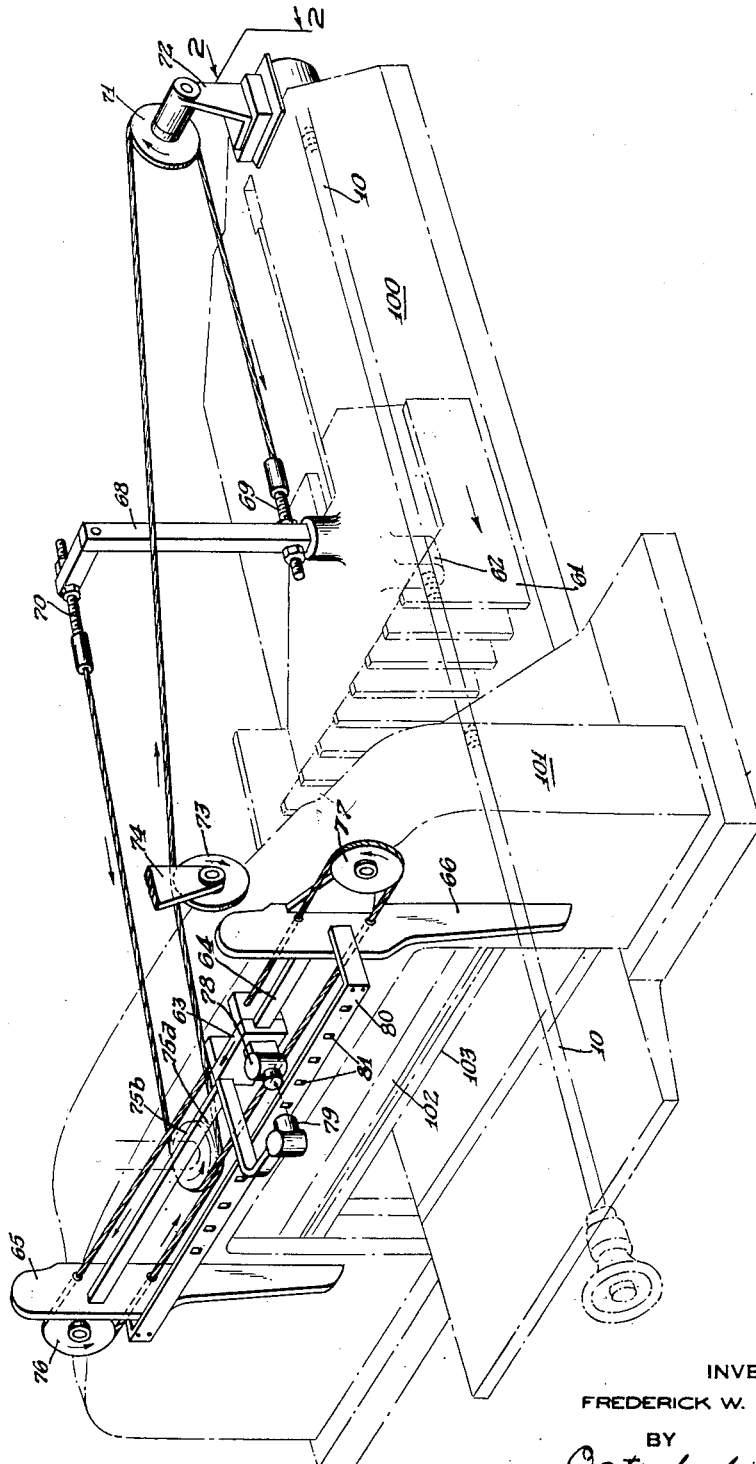
Figure 1 is a schematic view in perspective of my novel automatic back gauge spacer.

Referring first to Figure 1, the cutter comprises a bed or table 100 and frame 101 carrying a knife 102 and a clamp 103 operating in the manner described in my application Serial No. 2,347, filed January 15, 1948, now Patent No. 2,487,031.

A back gauge 61 is provided driven by the screw 10 which is threaded into a nut 62 integral with the back gauge. The direction of movement of the back gauge depends upon the direction of rotation of the screw 10. Secured to screw 10 (Figure 4) by means of feather key 11 is the planetary gear arm 12, which is provided with studs 13. Compound planetary pinions 14, 15 are journalled on studs 13. Planet gears 14 mesh with sun gear 16. Gear 16 is provided with a long hub 17, into the bore of which is fitted the bushing 18. The casing 19 is provided with a hub 20 which is secured to the hub 17 by means of screws 21. A V-belt pulley 22 is fastened to the casing 19 by the screws 23 and a ball bearing 24 journals pulley 22 on the hub 12a of the planetary gear arm 12.

Planet gears 15 mesh with the sun gear 25, which is secured to the long hub 26 of V-belt pulley 27 by the screws 28. A bushing 29 is pressed into hub 26, and the sun gear 25 and provides a bearing on the screw 10 which is journalled in the long bushing 30 of the bracket 31 which is fastened to the underside of the table 100 and on the upperside of which the back gauge 61 moves forward or backward.

V-belt pulley 27 is driven by motor pulley 33 (Figure 2) and belt 33a on the single speed reversible motor 34. V-belt pulley 22 is driven by the pulley 35 and belt 35a on the two-speed reversible motor 36.

Figure 3:
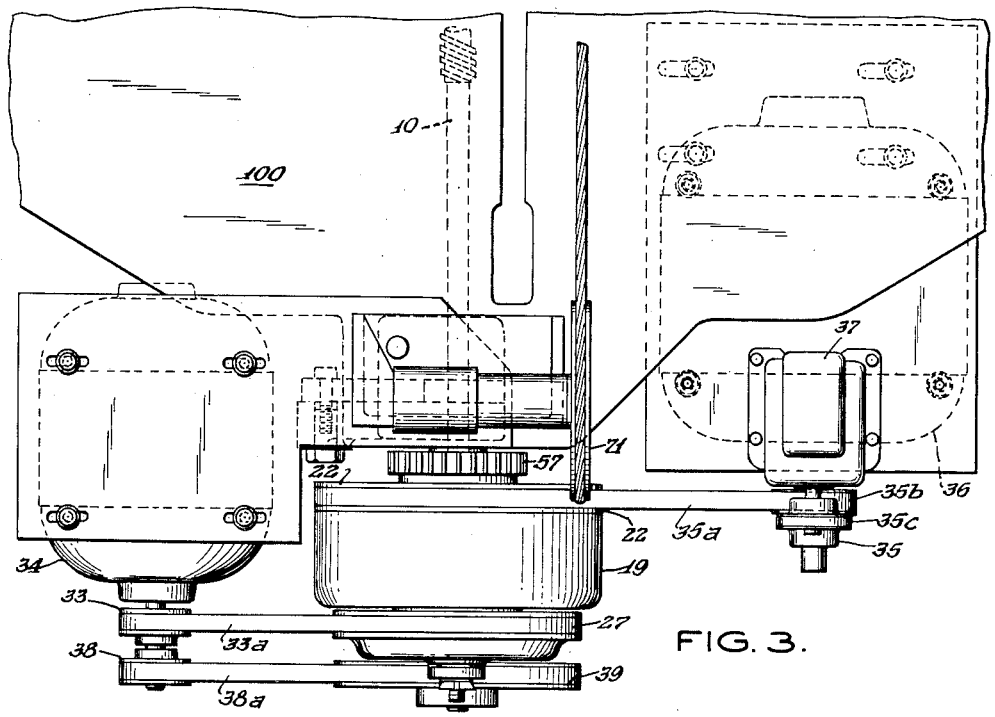
Figure 3 is a top view of the drive elements of Figure 2.
Figure 2:
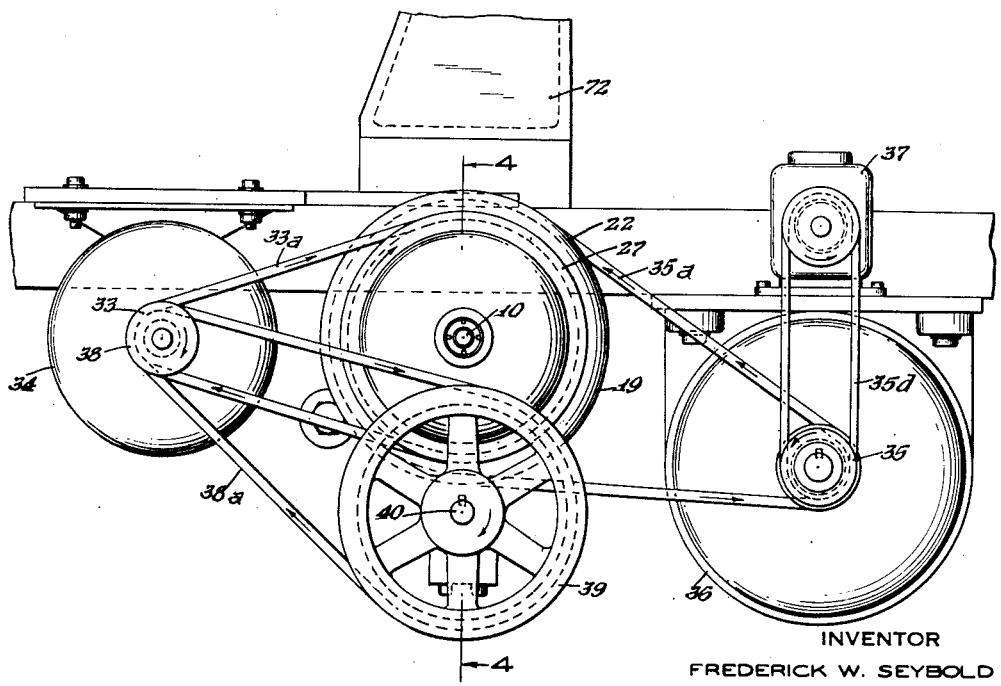
Figure 2 is an end view of the drive members taken from line 2—2 of Figure 1 looking in the direction of the arrows.

Pulley 35 has two sheaves 35b and 35c (Figures 2 and 3). The outside sheave 35c drives the plugging switch 37. The inside sheave 35b drives pulley 22 through belt 35d.

The following transmission train, the function of which will be hereafter described, is also provided:

A second motor pulley 38 (Figures 2 and 3) on motor 34 through belt 38a drives the V-belt pulley 39 keyed on the shaft 40 (Figure 4) which is journalled in the bearing 41 and in the long bore 42 of the clutch gear 43. This gear is journalled in bearing 44 which is provided in the swinging arm 45 suspended from the long bushing 30 of the bracket 31. Clutch gear 43 has jaw clutch teeth 46 which mate with the teeth of the jaw clutch 47 which is longitudinally slidably mounted on key 48 of the shaft 40.

A compression spring 49 between the clutch 47 and collar 50 fastened to the end of shaft 40 urges the clutch 47 into engagement with clutch teeth 46.

A solenoid 51 having an armature 51a and mounted on bracket 52 secured to the swinging arm 45 by bolts 52a cooperates through the levers 53 pivoted at 54 on the bracket 52 to disengage the clutch 47 from the clutch teeth 46 when the solenoid is energized.

An idler gear 55 is free to rotate on fixed stud 56 in bracket 45 and meshes with clutch gear 43 and gear 57 which is secured by screws 58 to the inner member of a one-way clutch 59 (see also Figure 6). The outer member of said one-way or over-running clutch is secured to the V-belt pulley 22.

A second one-way or over-running clutch 60 (see also Figure 5 as well as Figure 4) is incorporated between the sun gear 25 and sun gear 16; its function will also be hereinafter described.

For the convenience of the operator in making a set-up for the step by step movement of the back gauge 61, said movement is transferred to a carriage 63 (Figure 1) which traverses on a rectangular bar 64 supported on brackets 65 and 66. These brackets are secured to the frame 101 of the paper cutting machine by screws or in any other suitable manner.

Secured to the back gauge 61 is an upright bar 68 to which are fastened the cable ends 69 and 70.

The cable from end 69 passes horizontally over sheave 71 on bracket 72 and thence to sheave 73 on bracket 74 fastened to the frame of the machine. It continues over one of the horizontal sheaves 75a and on to vertical sheave 76 and terminates at the carriage 63.

The cable from end 70 passes horizontally over the other sheave 75b and continues to the right to vertical sheave 77 and also terminates at the carriage 63.

In this manner, the carriage 63 duplicates the movement of the back gauge, i. e., when the back gauge is all the way back, the carriage 63 will be over to the right-hand side and as the back gauge 61 moves forward, the carriage 63 will move to the left.

Supported on the carriage 63 is a photo-tube 78 and a light source 79. Between them passes the removable or adjustable stationary strip 80 in which rectangular openings 81 of suitable width are cut to correspond to stopping positions for the back gauge 61.

Various slide members, markers or pointers may be used in place of strip 80 to create the openings 81 at desired intervals. Or individual strips may be provided with openings cut at appropriate intervals for each run. Preferably strip 80 is equal in length to the length of travel of back gauge 61.

The right-hand vertical edge of each rectangular opening 81 serves as the signal which the photo-tube 78 receives to throw the motor 36 from its high speed into its low speed condition, thereby producing a very slow speed through the gearing of the transmission.

After the photo-tube has traversed the open space of the rectangle, the left-hand edge of the rectangle will then cut off the illumination from the photo-tube and this serves as the signal for plugging motor 36 and also stopping motor 34.

It is important that both motors come to a stop at the same time. There is a tendency for motor 36 to slow down faster than motor 34 because its speed drops from about 850 R. P. M. to zero, whereas the speed of motor 34 drops from 1750 R. P. M. to zero. In order to prevent this, gear train 43—55—57 is provided with the one-way or over-running clutch 59, the latter permitting pulley 22 to turn faster than gear 57; but the speed of pulley 22 cannot fall below that of gear 57.

When the speed of motor 36 drops faster than the speed of the motor 34, this would bring about a reversal in the direction in which the screw is turning and this would be detrimental to accuracy so in order to prevent the speed of the motor 36 from dropping at too great a speed, the gear train 43—55—57 acts as a brake on the motor 36; that is, the overrunning clutch 59 will permit the motor 36 to turn at a higher rate than motor 34 but it will prevent the speed of motor 36 from dropping below the speed of the gear 57 to which the over-running clutch or one-way clutch 59 is fastened and thereby a reversal of the screw 10 is prevented.

The gear 43 is provided with clutch teeth 46 and when the back gauge 61 is to be returned to its rearmost position, the clutch 47 must be disconnected from the clutch teeth 46 because the gear ratio, when now gear 57 is driving gear 43, the pulley 39 would be turning more than two times as fast as the motor pulley 27, and this would produce too great a load on the driving mechanism.

Therefore, the solenoid 51 is provided which acts through the lever 53 to disengage the clutch 47 from the teeth 46 when the back gauge is to be returned just prior to the engagement of the reversing contactor which will move the back gauge to the rearmost position.

In a similar manner, the one-way clutch 60 prevents the smaller motor 34 from over-running or turning faster than the motor 36 when both motors are operating in a reverse direction.

In other words, one-way clutch 59 acts as a brake on motor 36 when the speed of motor 36 is dropping from its high speed in the forward direction, while one-way clutch 60 prevents the motor 34 from over-running motor 36 when they are turning in the reverse direction and coming to a stop.

In this way, both motors are mechanically connected because it is not possible to plug stop two motors with one plugging switch, nor is it possible to have a plugging switch on each motor and have them act identically alike so that both motors arrive at zero speed at the same instant, which is important in order to produce accuracy of stopping of the screw 10.

By this means, the back gauge 61 is first slowed down as the light from light source 79 passes through an opening 81 on to photo-tube 78 and is stopped when the light source is cut off by the edge of opening 81.

Thus, the back gauge 61 and carriage 63 are first moved rapidly to near the stopping position, slowed down near the stopping position and then accurately stopped. Over-running or coasting of the paper pile is thus prevented and speed and accuracy are retained.

The term plugging when used with alternating current motors means that when a motor is turning in a clockwise direction and then the rotation of the synchronous field is reversed, which means that there is a 200% slip on the rotor, this will bring about a quick stop of said rotor and at the time when the rotor approaches zero speed, the contactor is automatically opened by a device called a plugging switch.

Figure 8:
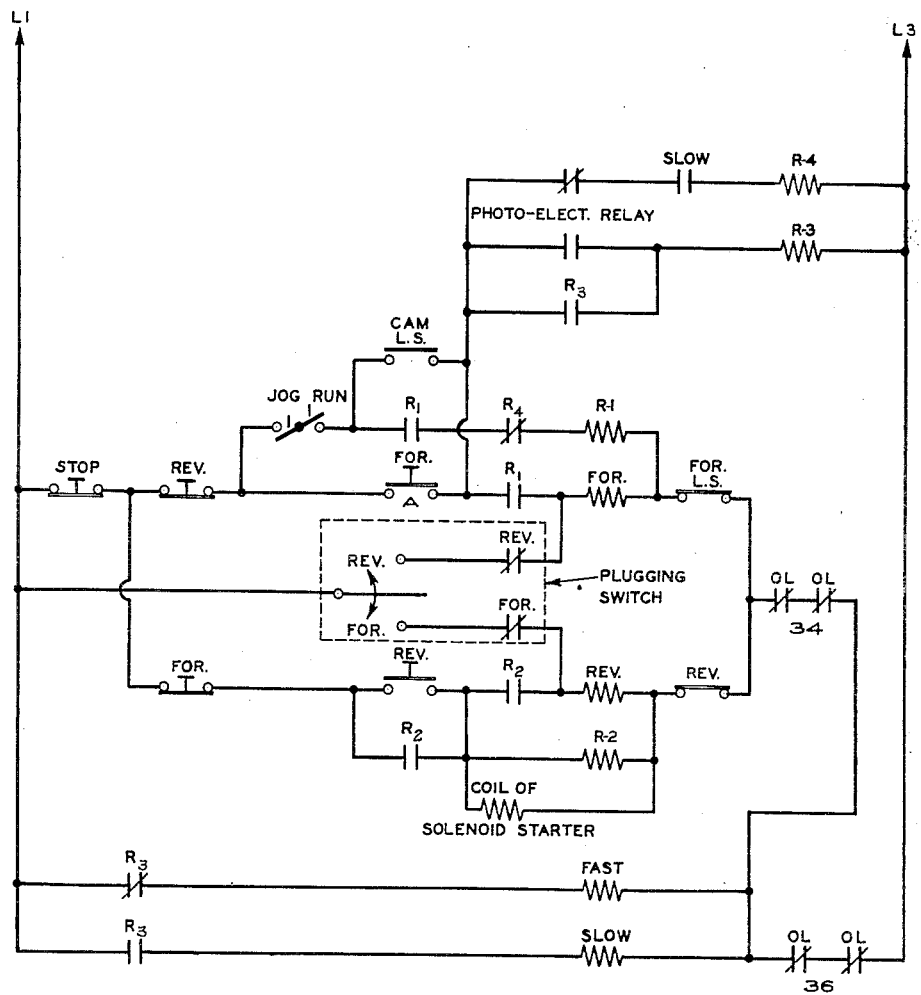
Figure 8 is a circuit diagram of the connections for operating my novel automatic spacer.

The operation of the device is schematically shown in the elementary circuit diagram of Figure 8.

It should first be pointed out that the "forward" operation of the back gauge is preferably initiated by a switch operated at the upper portion of the return stroke of the knife and clamp so that, as soon as a cut is finished, the operation of the back gauge to the next step is begun. The operation may also be initiated by a manually operated button.

In the circuit diagram of Figure 8, it is to be observed that the "Fast" contactor of the pole changing switch is "in," a circuit being established from L1—R3 (normally closed) "Fast" coil, OL—OL to L3.

The reason for this is to gain time in starting so that when the "Forward" coil of the reversing starter is energized the time lag for bringing in the "Fast" coil is eliminated, and both motors begin to rotate at the same time.

When the forward button A is depressed, the following circuit is established—L1—Stop—Rev.—FWD—R4—R1—For. L. S.—OL—OL—OL—OL—L3.

As a result, the normally open contacts R1 close and the "Forward" coil of the reversing starter becomes energized and then both motors 34 and 36 start up in the forward direction.

Upon release of the "Forward" button, current is maintained through—L1, Stop—Rev.—Jog/Run—R1—R1—FOR—For. L. S.—OL—OL—OL—OL—L3.

The same program can be carried out when the Cam L. S. is depressed instead of the "Forward" button.

Assuming that the photo-tube is travelling "dark" in high speed and light strikes the tube through one of the rectangular openings 81 described previously and as a result the photo-tube relay energizes relay R3, closing the normally open contacts R3 and opens the normally closed contact R3 of the "Fast" circuit, a circuit is now established—L1—R3 "Slow"—OL—OL—L3. In other words, the two-speed motor 36 now operates in "slow" speed, while motor 34 continues in high speed.

After a short travel in "slow" speed, the rectangular opening again darkens the photo-tube. The normally open contact "Slow" was closed at the time the "Slow" speed circuit was made and when the photo-electric relay is returned to its original position (dark) coil R4 becomes energized and opens the normally closed contacts R4, thereby breaking the holding circuit of the "Forward" coil.

While the "Forward" coil was energized, the normally closed contact "FOR" in the plugging circuit was opened and now when the "Forward" coil is de-energized this "FOR" contact returns to its normally closed condition, thereby establishing the following circuit—L1—FOR (of Plugging Switch)—FOR—Rev.—Rev. L. S.—OL—OL—OL—OL—L3. The motor terminals have thereby been reversed and 200% slip between the motor rotor and the stator brings about a rapid deceleration of the rotors of both motors and when the speed of the rotors drops to a speed corresponding to the adjustment of the plugging switch, its contacts open and drop out the plugging switch contactor and both motors come to a standstill.

After the back gauge has advanced step by step and has reached its last required forward position, the gauge may be returned to the rear by depressing the "Reverse" button, whereby the following circuit will be established—L1—Stop—FOR (N. C.)—Rev. (N. O.)—R2—Rev. L. S.—OL—OL—OL—OL—L3.

The coil of the solenoid starter will also be energized and thereby close the solenoid contactors energizing the solenoid 51 and disengage the clutch 47.

The N. O. contactors R2 will now be closed, maintaining current on coil R2 and as a result the "Reverse" coil of the reversing starter will become energized and close the contacts for the reverse operation of both motors.

The reverse plugging circuit is now inoperative because the N. C. Rev. contactor is opened, but as soon as the "Stop" button is depressed or the Rev. limit switch is opened, the "Reverse" coil and R2 coil become de-energized, dropping out both R2 contactors and the Rev. coil of the reversing starter, permitting the N. C. Rev. contactor of the plugging circuit to close and establish a circuit through the "Forward" coil of the reversing starter, whereby the motor terminals become again reversed and bring about a rapid deceleration, as described above, and both motors come to a quick stop.

In the foregoing I have described my invention solely in connection with specific illustrative embodiments thereof. Since many variations and modifications of my invention will now become obvious to those skilled in the art, I prefer to be bound not by the specific disclosures herein contained but only by the appended claims.

I claim:

1. A movable back gauge for a cutting machine having a reciprocating knife, drive apparatus for stepping said back gauge to a plurality of preselected successive positions, said apparatus including a drive motor and a shaft connected between said drive motor and said back gauge; control means responsive to the approach of said back gauge to a selected position to reduce the speed of said shaft and said back gauge, said control means being responsive to the arrival of the back gauge at a selected position to halt said shaft; said control means including a photo-sensitive member movable synchronously with said back gauge; a source of light; and light control elements at each selected stop position cooperating with said photo-sensitive member; said control means including a photo-sensitive member and a light source movable synchronously with said back gauge; an opaque member between said light source and said photo-sensitive member; openings in said opaque member at each successive stop position; circuit connections between said photo-sensitive member and said drive motor responsive to impingement of light on the photo-sensitive member to slow said drive shaft and responsive to subsequent interception of light by said opaque member to halt said drive shaft, and additional means for initiating the movement of said back gauge following a halt thereof.

2. A movable back gauge for a cutting machine having a reciprocating knife, drive apparatus for stepping said back gauge to a plurality of pre-selected successive positions, said apparatus including a drive motor and a shaft connected between said drive motor and said back gauge; control means responsive to the approach of said back gauge to a selected position to reduce the speed of said shaft and said back gauge, said control means being responsive to the arrival of the back gauge at a selected position to halt said shaft; said control means including a photo-sensitive member movable synchronously with said back gauge; a source of light; and light control elements at each selected stop position cooperating with said photo-sensitive member; said control means including a photo-sensitive member and a light source movable synchronously with said back gauge; light control means between said light source and said photo-sensitive member; elements on said light control means permitting a passage of light and other elements intercepting light; at least certain boundaries between said elements of opposite characteristics being located at the stop positions of the back gauge and the photo-sensitive member.

3. A movable back gauge for a cutting machine having a reciprocating knife, drive apparatus for stepping said back gauge to a plurality of pre-selected successive positions, said apparatus including a drive motor and a shaft connected between said drive motor and said back gauge; control means responsive to the approach of said back gauge to a selected position to reduce the speed of said shaft and said back gauge, said control means being responsive to the arrival of the back gauge at a selected position to halt said shaft; said control means including a photo-sensitive member movable synchronously with said back gauge; a source of light; and light control elements at each selected stop position cooperating with said photo-sensitive member; said control means including a photo-sensitive member and a light source movable synchronously with said back gauge; light control means between said light source and said photo-sensitive member; elements on said light control means permitting a passage of light and other elements intercepting light; at least certain boundaries between said elements of opposite characteristics being located at the stop positions of the back gauge and the photo-sensitive member.

4. A movable back gauge for a cutting machine having a reciprocating knife, drive apparatus for stepping said back gauge to a plurality of pre-selected successive positions, said apparatus including drive apparatus and an output connection between said drive apparatus and said back gauge, control means responsive to the approach of said back gauge to a selected position to reduce the speed of said output connection and said back gauge; said control means being responsive to the arrival of the back gauge at a selected position to halt said back gauge; said control means including a photo-sensitive member movable synchronously with said back gauge; a source of light; and light control elements at each selected stop position cooperating with said photo-sensitive member; said control means including a photo-sensitive member and a light source movable synchronously with said back gauge; light control elements at each selected stop position cooperating with said photo-sensitive member and said light source to control the impingement of light upon said photo-sensitive member.

5. A movable back gauge for a cutting machine having a reciprocating knife, apparatus for stepping said back gauge to a plurality of pre-selected successive positions; said apparatus including a first driving motor, a second driving motor, a drive shaft connected to said back gauge and a transmission between said driving motors and said shaft; means for initiating the operation of said motors simultaneously in the same direction to drive said shaft at relatively high speed; control means responsive to the approach of said back gauge to a selected position to reduce the speed of one of said motors to reduce the forward speed of said shaft and back gauge, said control means being responsive to the arrival of the back gauge at a selected position to halt both motors; said control means including a photo-sensitive member and a light source movable synchronously with said back gauge; a stationary opaque member between said light source and said photo-sensitive member; openings in said opaque member at each successive stop position; circuit connections between said photo-sensitive member and said drive motor responsive to impingement of light on the photo-sensitive member to slow said drive shaft and responsive to subsequent interception of light by said opaque member to halt said drive shaft, and additional means for initiating the movement of said back gauge following a halt thereof.

6. A movable back gauge for a cutting machine having a reciprocating knife, apparatus for stepping said back gauge to a plurality of pre-selected successive positions; said apparatus including a first driving motor, a second driving motor, a drive shaft connected to said back gauge and a transmission between said driving motors and said shaft; means for initiating the operation of said motors simultaneously in the same direction to drive said shaft at relatively high speed; control means responsive to the approach of said back gauge to a selected position to reduce the speed of one of said motors to reduce the forward speed of said shaft and back gauge, said control means being responsive to the arrival of the back gauge at a selected position to halt both motors; said transmission comprising a pair of driven members; sun and planet gear connections between each driven member and said shaft, and a drive connection between each motor and a driven member.

7. A movable back gauge for a cutting machine having a reciprocating knife, apparatus for stepping said back gauge to a plurality of pre-selected successive positions; said apparatus including a first driving motor, a second driving motor, a drive shaft connected to said back gauge and a transmission between said driving motors and said shaft; means for initiating the operation of said motors simultaneously in the same direction to drive said shaft at relatively high speed; control means responsive to the approach of said back gauge to a selected position to reduce the speed of one of said motors to reduce the forward speed of said shaft and back gauge, said control means being responsive to the arrival of the back gauge at a selected position to halt both motors; said transmission comprising a pair of driven members; sun and planet gear connections between each driven member and said shaft, and a drive connection between each motor and a driven member, and an over-running clutch connection between each driven member and its sun and planet gear connection.

8. A movable back gauge for a cutting machine including drive apparatus for forwardly driving said back gauge, and motion control means for said drive apparatus comprising a photo-sensitive device and a light source to which it is responsive, including a member therebetween adapted to control light from said light source to said photo-sensitive device, and means for providing relative motion between said member and the path of light from said light source to said photo-sensitive device synchronously with motion of said back gauge, said member comprising means for intermittently permitting light to pass to said photo-sensitive device during the forward course of travel of said back gauge for intermittently stopping said driving source, whereby said back gauge is moved to a plurality of forward successive positions as determined by said intermittent passing of light to said photo-sensitive device so as to position a stack of paper for successive cuts in lengths determined by said successive positions.

9. A movable back gauge as set forth in claim 8, wherein said member comprises a body having opaque and non-opaque areas in alternative arrangement and disposed so as to successively pass through said path of light, the alternative positioning of said opaque and non-opaque areas being predetermined in accordance with the lengths of paper it is desired to successively cut.

10. A movable back gauge for a cutting machine including drive apparatus for forwardly driving said back gauge, and motion control means for said drive apparatus comprising a photo-sensitive device and a light source to which it is responsive, including a member therebetween adapted to control light from said light source to said photo-sensitive device, and means for providing relative motion between said member and the path of light from said light source to said photo-sensitive device synchronously with motion of said back gauge, said member comprising means for intermittently interrupting and permitting the passage of light to said photo-sensitive device at selected positions of said back gauge for intermittently controlling said driving source to move and stop said back gauge, whereby said back gauge is moved to a plurality of forward successive positions as determined by said intermittent passing of light to said photo-sensitive device so as to position a stack of paper for successive cuts in lengths determined by said successive positions.

FREDERICK W. SEYBOLD.

REFERENCES CITED

The following references are of record in the file of this patent:

UNITED STATES PATENTS

| Number | Name | Date |
| --- | --- | --- |
| 1,270,028 | Henderson | June 18, 1918 |
| 2,053,499 | Seybold et al. | Sept. 8, 1936 |
| 2,116,593 | Bouvier et al. | May 10, 1938 |
| 2,487,031 | Seybold | Nov. 1, 1949 |